INVENTORS
CHARLES M. LORING Jr.
JEFFREY B. DUNCAN

BY Robert N Dilts

ATTORNEY

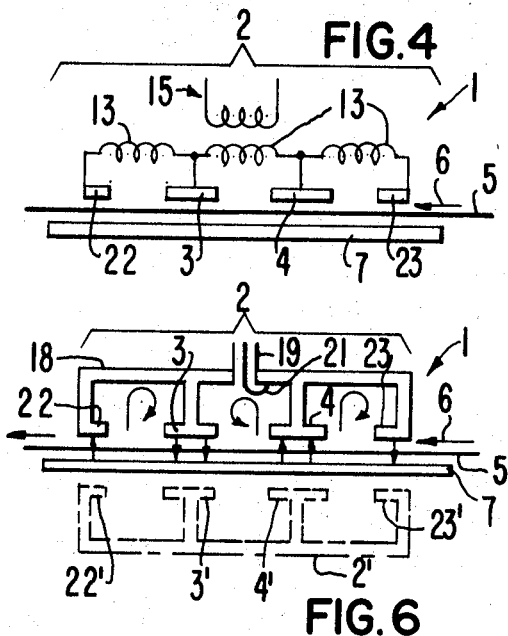
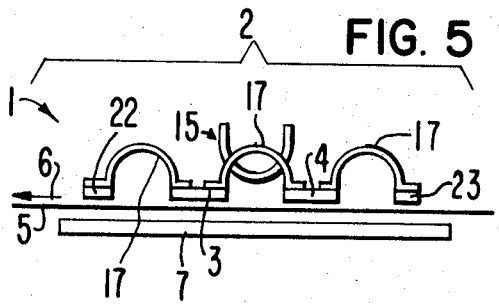
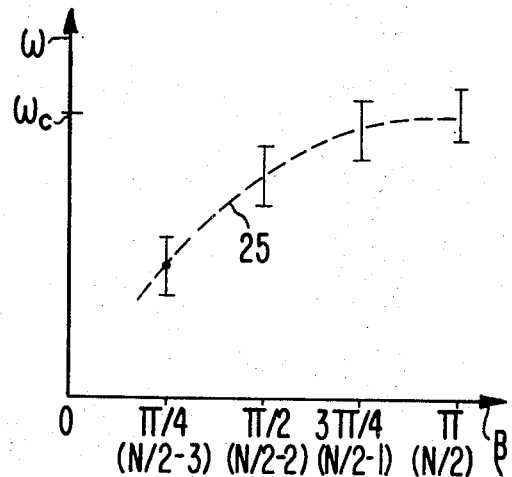
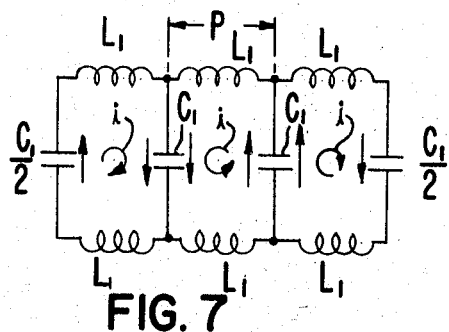
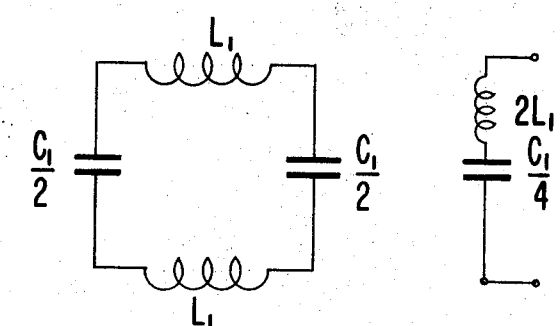
FIG. 4
FIG. 5
FIG. 6
FIG. 8
FIG. 7
FIG. 9　　FIG. 10　　FIG. 11
INVENTORS
CHARLES M. LORING Jr.
JEFFREY B. DUNCAN
BY
ATTORNEY Oct. 6, 1970  C. M. LORING, JR., ET AL  3,532,848
RESONANT R. F. ENERGY APPLICATOR FOR TREATING
WIDE REGIONS OF MATERIAL
Filed April 26, 1968  3 Sheets-Sheet 3

INVENTORS
CHARLES M. LORING Jr.
JEFFREY B. DUNCAN
BY
*Robert W Dilts*
ATTORNEY

# United States Patent Office 3,532,848
Patented Oct. 6, 1970

3,532,848
RESONANT R.F. ENERGY APPLICATOR FOR TREATING WIDE REGIONS OF MATERIAL
Charles M. Loring, Jr., Jonesville, and Jeffrey B. Duncan, Petersburg, N.Y.; said Loring assignor to Varian Associates, Palo Alto, Calif., a corporation of California, and said Duncan assignor to W. T. La Rose and Associates, Inc., Cohoes, N.Y., a corporation of New York
Filed Apr. 26, 1968, Ser. No. 724,355
Int. Cl. H05b 9/06, 9/04
U.S. Cl. 219—10.61                    7 Claims

ABSTRACT OF THE DISCLOSURE

A resonant plural gap R.F. energy applicator for treating wide regions of material is disclosed. At least two elongated electrodes having a length in excess of ⅛ of a wavelength at the operating frequency are disposed in side-by-side relation on one side of a thin sheet-like region of space through which a moving stream or sheet of material is passed for treatment. A second electrode structure, either in the form of a sheet conductor or in the form of similar elongated electrodes, is disposed on the opposite side of the treatment region from the first pair of electrodes to define at least a pair of capacitive treatment gaps extending cross-wise of the direction of motion of the material to be treated. Inductive coupling means such as a series of lumped inductors distributed along the length of the electrodes or a distributed inductor interconnect the pair of electrodes on one side of the treatment zone for resonating the capacity of the pair of treatment gaps.

DESCRIPTION OF THE PRIOR ART

Heretofore, plural elongated electrodes have been disposed in side-by-side spaced relation on one side of a moving sheet-like zone of material for applying high frequency electric fields to the material for treating same. In such prior art structures, the elongated electrodes have extended across the material to be treated with the electrodes extending transversely of the direction of movement of the material. Lumped inductors have been provided interconnecting adjacent electrodes for resonating the capacitive gap between two adjacent electrodes on the same side of the material. In this manner, the sheet-like material to be treated was exposed to the fringing electric fields between two adjacent electrodes disposed on the same side of the material to be treated. While this arrangement of electrodes permits treatment of relatively wide webs of continuously moving material, the applicator is relatively inefficient since only the fringing electric fields of the applicator can be employed for treating the material.

Other prior art R.F. applicator structures have employed resonated capacitive electrodes disposed on opposite sides of the material to be treated. But such electrodes have been resonated by a series of tuning inductors which bridge across the capacitive treatment gap. Such tuning inductors are necessary to insure an even distribution of the intensity of the resonant electric field along the length of the capacitive gaps when the capacitive gaps have a length which corresponds to a substantial fraction of a wavelength, for example, greater than ⅛ of a wavelength. These tuning inductors which bridge across the treatment gap prevent use of this arrangement of electrodes for treating wide webs of continuously moving material which moves through the electrode structure in a direction transverse to the elongated direction of the electrodes. Such a prior art structure is described in the text titled "Radio Frequency Heating" by Brown, Hoyler and Bierwith; Van Norstrand, 1947, chaper 19, pp. 272–279. A higher frequency version of the high frequency energy applicator described in the aforecited text is disclosed in U.S. Pat. 2,783,349, issued Feb. 26, 1957.

SUMMARY OF THE PRESENT INVENTION

The principal object of the present invention is the provision of an improved high frequency applicator for applying high frequency electric fields to wide and thin treatment zones.

One feature of the present invention is the provision, in a high frequency energy applicator, of first and second electrode structures disposed on opposite sides of a thin and wide zone of material to be treated, one of the electrode structures including a pair of elongated electrodes extending in the direction of the wide dimension of the material to be treated and defining with the second electrode structure a pair of capacitors between which the material to be treated is located, and inductive tuning means disposed only on one side of the treatment zone for interconnecting adjacent electrodes of the first electrode structure for resonating the capacitance of the pair of capacitors, whereby a resonant high frequency applicator is obtained without the inductive tuning means bridging across the treatment gaps to interfer with positioning of the material to be treated.

Another feature of the present invention is the same as the preceding feature wherein the inductive coupling means comprises a plurality of lumped inductors connected electrically in parallel with each other and distributed at intervals along the length of said pair of electrodes.

Another feature of the present invention is the same as the first feature wherein the inductive coupling means comprises a continuous inductor which is substantially axially coextensive with the entire length of said pair of adjacent coupled electrodes.

Another feature of the present invention is the same as any one or more of the preceding features including the provision of a conductive housing enclosing the first and second electrode structures and serving as an electromagnetic shield to minimize stray radiation of high frequency energy from the excited applicator.

Another feature of the present invention is the same as any one or more of the preceding features wherein the first and second electrode structures are concentrically disposed for treating thin tubular zones of material.

Another feature of the present invention is the same as any one or more of the preceding features wherein the first electrode structure on one side of the treatment zone includes an array of elongated electrodes for producing with the second electrode structure an array of capacitive treatment gaps.

Other features and advantages of the present invention will become apparent upon a perusal of the following specification taken in connection with the accompanying drawings wherein:

BRIEF DESCRIPTION OF THE DRAWINGS

FIG. 4 is a schematic side elevational view of a multi-electrode applicator of the basic type depicted in FIG. 1.

FIG. 5 is a side elevational view similar to that of FIG. 4 depicting a multi-electrode applicator of the basic type shown in FIG. 2.

FIG. 6 is a side elevational view of a multi-electrode applicator of the basic type shown in FIG. 3 and depicting in phantom lines an alternative structure wherein the ground plane electrode is replaced by an electrode structure similar to the upper electrode structure.

FIG. 7 is an equivalent circuit for the multi-electrode applicators of FIGS. 4–6.

FIG. 8 is an $\omega$-$\beta$ diagram for a composite resonant applicator structure.

FIG. 9 is an equivalent circuit for one period of the structure of FIG. 7.

FIG. 10 is a simplified resonant circuit for that of FIG. 9.

FIG. 11 is a simplified resonant circuit assuming a ground plane electrode is employed.

DESCRIPTION OF THE PREFERRED EMBODIMENTS

Figure 1:
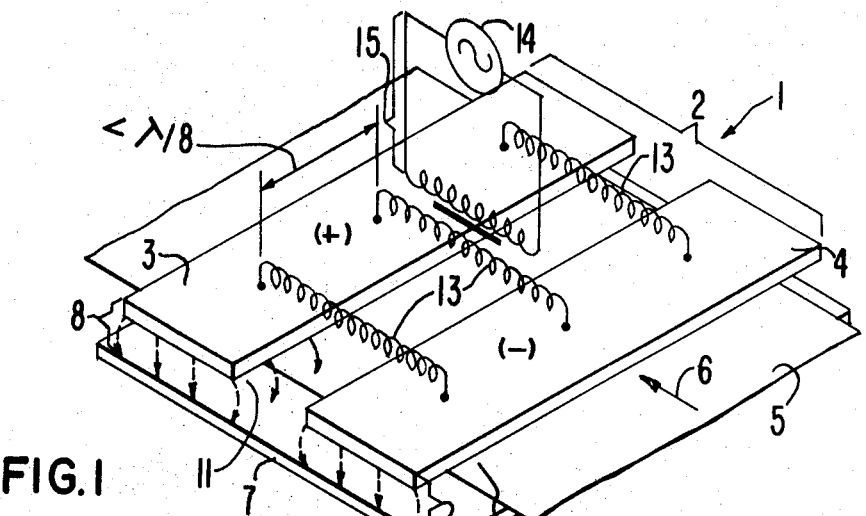
FIG. 1 is a schematic perspective view of a high frequency energy applicator incorporating features of the present invention.

Referring now to FIG. 1, there is shown a high frequency energy applicator 1 incorporating features of the present invention. The applicator 1 includes a first electrode structure 2 formed by a pair of elongated conductive plates 3 and 4, as of brass, disposed in side-by-side relation on the same side of relatively wide material 5 which is to be treated with the high frequency energy. In the illustrated embodiments, a sheet of material 5, which is to be treated, is moved past the electrodes 3 and 4 in a direction transverse to the elongated direction of the electrodes as indicated by the arrow 6. However, wide materials can be treated by a batch process with the applicator 1 of the present invention by placing the material beneath the electrodes, subjecting the material to the high frequency energy for the desired treatment time, and then removing the material from the applicator. A second electrode structure 7, such as a conductive plate serving as a ground plane member, is disposed on the opposite side of the moving sheet 5 from the first electrode structure 2. The elongated electrodes 3 and 4 form a pair of capacitors 8 and 9 with the ground plane member 7 and define a pair of capacitive treatment gaps 11 and 12 which are elongated and which extend across the moving sheet 5.

A plurality of lumped inductors 13 interconnect the electrodes 3 and 4 at spaced intervals along the length of the conductors 3 and 4. In this manner, the inductors 13 are connected in parallel with each other and are distributed along the length of the electrodes 3 and 4. The inductors 13 have their inductance chosen for resonating the capacitance of the gaps 11 and 12 at a certain operating frequency.

High frequency energy is coupled to the resonated electrode structure from a source 14 via a suitable coupling structure 15. The frequency of the energy supplied from the source 14 is preferably selected at the resonant frequency of the electrode structure consisting of the resonated gaps 11 and 12 such that the resonant standing wave fields are coupled through the sheet of material 5 to be treated. The interval of spacing between adjacent inductors 13 taken in the direction along the length of the conductors 3 and 4 is preferably less than ⅛ of an electrical wavelength to insure that a uniform distribution of electric field is coupled into the sheet 5 in a direction across the broad side of the sheet and along the length of the electrodes 3 and 4.

The advantage of the applicator 1 of the type described in FIG. 1 is that efficient utilization of the available fields in the capacitive treatment gaps is obtained for an electrode structure which may be extended in length to accommodate sheets of material having widths of almost any extent. For example, electrodes 3 and 4 may be extended to almost any arbitrary length and may be many wavelengths long while maintaining a uniform distribution of the resonant electric fields over the entire length of the electrodes and therefore across the entire width of the sheet 5.

Figure 2:
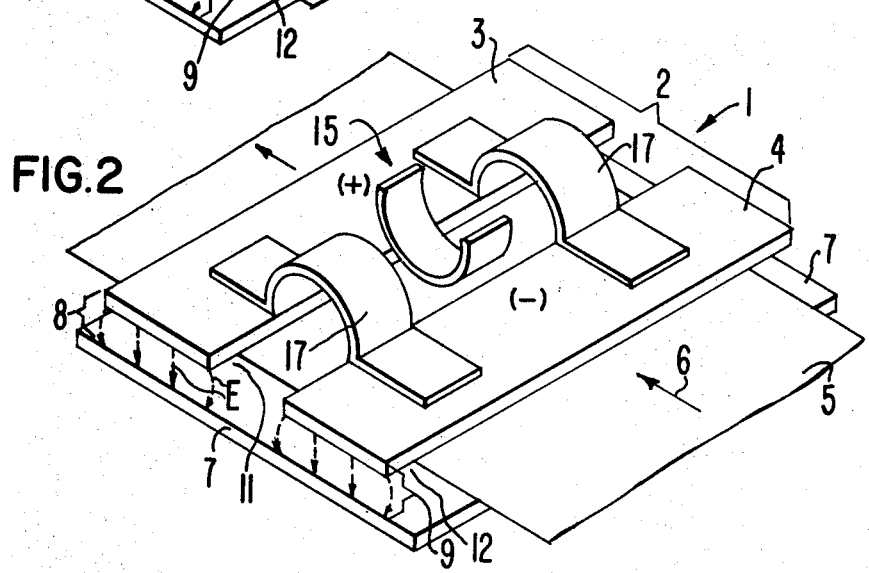
FIG. 2 is a view similar to that of FIG. 1 depicting an alternative applicator for operation at higher frequencies.

Referring now to FIG. 2 there is shown an alternative embodiment of a high frequency applicator 1 similar to that of FIG. 1 with the exception that the inductors 13 have been replaced by relatively wide conductive straps 17. The conductive straps have less inductance than the lumped inductors 13 of FIG. 1 and, therefore, the structure of FIG. 2 is tuned for a higher resonant frequency than that to be employed in the structure of FIG. 1. As in the structure of FIG. 1, the inductive coupling straps 17 are preferably spaced at intervals along the length of the conductors 3 and 4 corresponding to less than ⅛ of an electrical wavelength in order to insure a uniform distribution of the resonant fields in the capacitive working gaps 11 and 12 taken in a direction across the web 5 and along the length of the electrodes 3 and 4.

Figure 3:
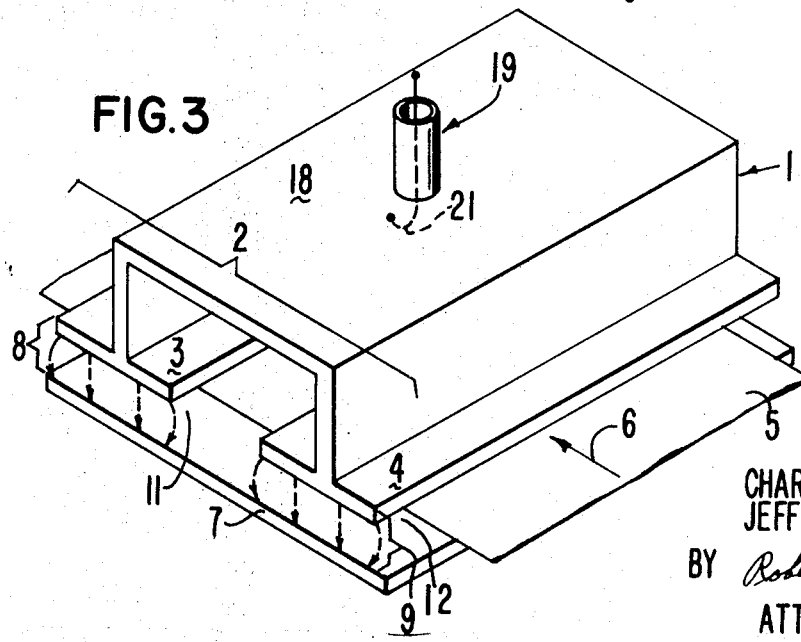
FIG. 3 is a view similar to that of FIG. 2 depicting an alternative applicator for operation at higher frequencies.

Referring now to FIG. 3 there is shown an alternative high frequency energy applicator 1 similar to the structures of FIGS. 1 and 2 with the exception that the inductive coupling means interconnecting the adjacent electrodes 3 and 4 has been provided by a continuous distributed inductance formed by an inverted conductive channel member 18. The distributed inductor 18 serves to resonate the capacitance of capacitors 8 and 9 at the frequency of wave energy to be applied to the applicator 1 via an input coaxial line 19 and coupling loop 21. The applicator 1 of FIG. 3 is substantially the same as those of FIGS. 1 and 2 except that it is designed for operation at higher radio frequencies.

Referring now to FIGS. 4–6, there is shown a number of applicators 1 employing an array of capacitive treatment gaps spaced apart in the direction of movement of the sheet of material 5. For the sake of explanation, only 4 treatment gaps are shown but it is to be recognized that the applicator 1 may include a great many more than 4 treatment gaps. The upper electrode structure 2, in addition to the electrodes 3 and 4, includes end electrodes 22 and 23 extending across the sheet 5 in the same manner as electrodes 3 and 4. In a preferred embodiment, the end electrodes 22 and 23 are only half as wide in the direction of movement of the sheet 5 as the intermediate electrodes 3 and 4. Inductive coupling means 13, 17 and 18, respectively, interconnect adjacent electrodes 3, 4, 22 and 23 for resonating the capacitance of the capacitive treatment gaps at the frequency of the wave energy to be applied to the electrode array 2. A coupling structure 15 or 19, respectively, is centrally disposed of the array 2 for coupling energy from the source 14, not shown, to the coupled array 2. If desired, plural input coupling structures may be employed for a single array 2. The advantage of employing an electrode structure 2 having an array of capacitive treatment gaps, is that more R.F. power may be applied to the sheet 5 without exceeding the voltage breakdown limits of the respective capacitive gaps.

The multi-electrode arrays 2 form a coupled periodic resonant circuit, which can be approximated by the equivalent circuit of FIG. 7. Such a periodic structure when disposed over a ground plane 7 can be treated electrically as though the periodic structure was disposed over a mirror image of its structure as indicated by 2' in phantom lines of FIG. 6. A period or section of such a structure, as indicated by P of FIG. 7, constitutes a resonant circuit element as shown in FIG. 9, where $L_1$ is the inductance of the inductive coupling means interconnected between adjacent electrodes 3 and 4, and the capacitors 8 and 9 have a capacitance $C_{1/2}$ where $C_1$ is the capacitance of the capacitive gaps 8 and 9 between electrodes 3 and 4 and their respective image electrodes 3' and 4'.

The circuit of FIG. 9 can be reduced to a resonant circuit as shown in FIG. 10, where the series inductance of the resonant circuit has a value $2L_1$ and the capacitance in series with the inductance is $C_1/4$. The resonant circuit of FIG. 10 also has the same resonant frequency as the circuit of FIG. 11, which is derived in the same manner as FIG. 9, from the ground plane model assuming that the capacitance of the gap 8 or 9 is obtained between the ground electrode 7 and the electrodes 3 or 4 and only a single inductor $L_1$ is provided interconnecting the electrodes 3 and 4 on one side of the material 5.

A coupled resonant circuit of the type shown in FIG. 7 has a dispersion characteristic indicated by the dotted line 25 of FIG. 8. The upper cut-off frequency for the first pass band of the circuit occurs at a frequency $\omega_c$ corresponding to the resonant frequency of the individual periodic elements as shown in FIGS. 9, 10 and 11. This resonant condition for the coupled circuit corresponds to a $\pi$ phase shift between successive capacitive gaps taken in the direction of movement of the sheet 5 and is referred to as the $\pi$ mode of operation of the composite coupled circuit. When such a coupled circuit has a finite length and is terminated at its ends in reflective discontinuities the circuit exhibits a number of resonant modes. If there are N number of periodic sections to the composite coupled resonator structure the structure will have N/2 possible resonant modes. Assuming there are eight periodic sections in the coupled resonator structure, there will be four possible resonant modes corresponding to $$\frac{N}{2}, \frac{N}{2}-1, \frac{N}{2}-2, \text{ and } \frac{N}{2}-3$$

having $$\pi \frac{3\pi}{4}, \frac{\pi}{2}, \text{ and } \frac{\pi}{4}$$

degrees of phase shift per section, respectively, as indicated by the vertical lines on the dispersion characteristic 25. These other possible resonant modes of operation occur at lower frequencies than the $\pi$ mode and are characterized by a null voltage occurring in one of the capacitive gaps. Since the gap having the null voltage does not contribute to treatment of the sheet 5, it is desirable to avoid operation on these other modes and to operate on the $\pi$ mode corresponding to the resonant frequency of each of the periodic sections.

In a preferred mode of operation, each of the periodic resonant sections P preferably has the same resonant frequency. Thus, in a case where the inductive coupling means, interconnecting adjacent electrodes, has the same inductance for each of the periodic sections of the multi-electrode array 2, the end electrodes 22 and 23 preferably have only half the width or half the capacitance of the intermediate electrodes 3 and 4, such that each of the periodic sections P of the array has a common or the same resonant frequency. However, it is possible that the end electrodes 22 and 23 may have the same width as the intermediate electrodes and the inductive coupling means 13, 17 and 18, respectively, can be dimensioned to have less inductance to maintain the same resonant frequency for each of the coupled resonant sections.

Figure 12:
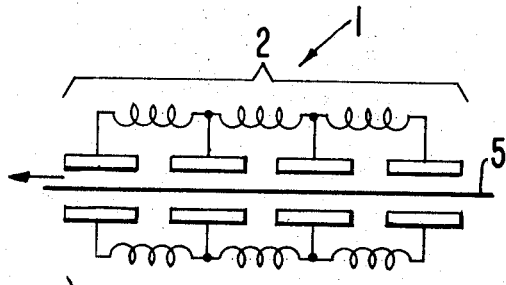
FIGS. 12–14 are views similar to FIGS. 4–6, respectively, and depicting applicators wherein the electrode structures on opposite sides of the material being treated have substantially similar configurations.
Figure 13:
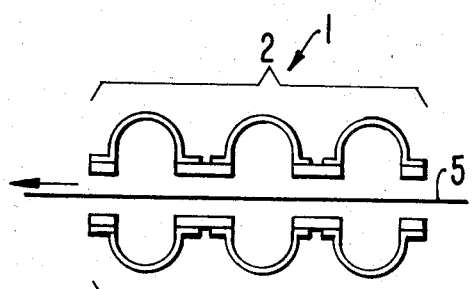
Figure 14:
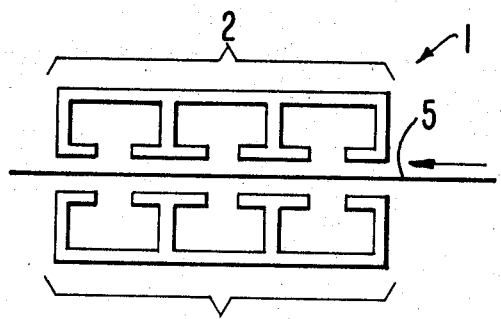

Referring now to FIGS. 12–14, there are shown alternative applicators 1 to those depicted in FIGS. 4–6, respectively. In these applicators of FIGS. 12–14 the ground plane electrode 7 is replaced by an image electrode structure 2', substantially identical to the first electrode structure 2 and disposed in the position of the mirror image electrode structure 2', as indicated in FIG. 6. Such applicator structures are electrically equivalent to the structures of FIGS. 4–6, but for the same resonant frequency provide twice as much volume in the treatment gaps and also are more open on the bottom to facilitate escape of vapors and liquids which are sometimes liberated during heating of certain types of sheet material.

Figure 16:
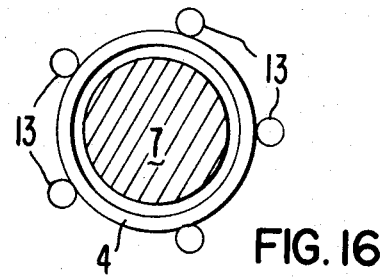
FIG. 16 is a sectional view of the structure of FIG. 15 taken along line 16—16 in the direction of the arrows.
Figure 15:
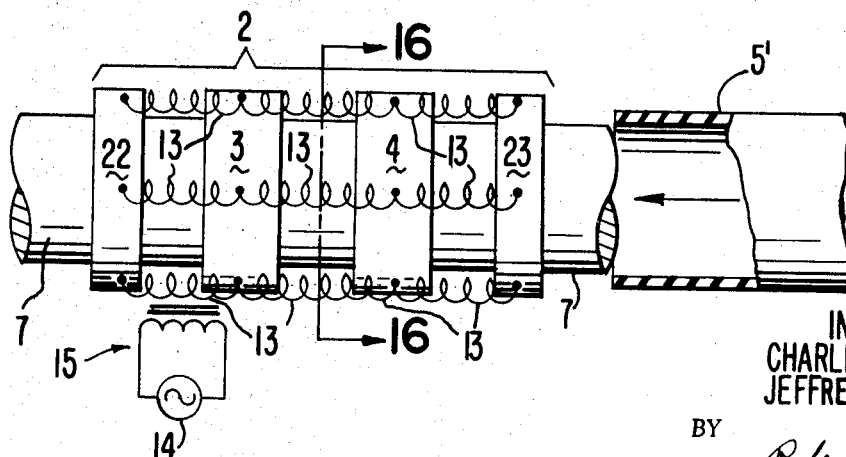
FIG. 15 is a side elevational view, partly broken away, of a concentric applicator of the general type depicted in FIGS. 1 and 4 as adapted for treatment of tubular materials.

Referring now to FIGS. 15 and 16, there is shown an alternative energy applicator of the general type, shown in FIGS. 1, 4, and 12, arranged for treatment of tubular material 5'. In this structure, the transversely disposed electrodes 22, 3, 4 and 23 are rings axially spaced apart in the direction of movement of the tubular sheet 5' and concentrically surrounded a cylindrical conductive ground plane electrode 7. As before, the inductors 13 resonate the capacitive gaps between the rings and the ground plane electrode 7 and the end rings 22 and 23 preferably have an axial extent only half that of the intermediate rings 3 and 4 for the reasons as previously advanced with regard to FIGS. 4–7. It is also contemplated that other electrode geometries may be utilized other than circular to conform to the surface shape of the material 5. Such other shapes would include, for example, U-shaped cross-section channel structures of sheet material. As in the previous examples of FIGS. 12–14, the ground plane electrode 7 may be replaced by an image ring electrode structure. Alternatively, the ground plane structure may surround the ring electrodes 2. Furthermore, the inductive coupling means, interconnecting adjacent rings, need not be of the lump inductor type, but may take the form of relatively wide straps similar to straps 17 of FIGS, 2, 5 and 13, or may take the form of distributed inductive channel members 18 similar to those shown in FIGS. 3, 6 and 14.

Figure 17:
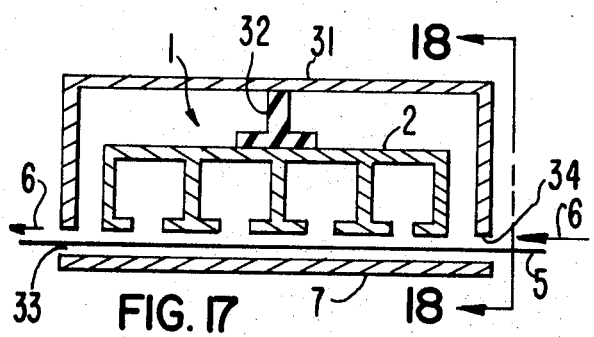
FIG. 17 is a longitudinal sectional view of a high frequency energy applicator including an enclosing conductive housing.
Figure 18:
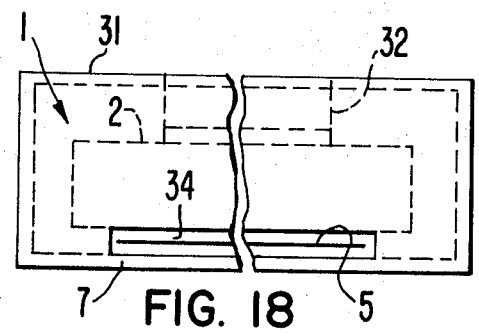
FIG. 18 is a view of the structure of FIG. 17 taken along line 18—18 in the direction of the arrows.

Referring now to FIGS. 17 and 18, there is shown a high frequency energy applicator 1 enclosed within a conductive housing structure 31, which conveniently takes the form of a rectangular box enclosing the applicator 1. A conductive or insulative support structure 32 supports the electrode structure 2 within the housing 31 over the ground plane 7. The ground plane 7 may be formed conveniently by the bottom wall of the housing 31. A pair of slots 33 and 34 are provided in opposite sides of the housing 31 to permit passage of the sheet material 5 through the applicator 1 and housing 31. The housing 31 serves to eliminate stray radiation of high frequency energy from the applicator 1 to the surrounds. High frequency electrical energy is coupled to the applicator 1 in the same manner as described with reference to the FIGS. 1–3.

The advantage of the applicator 1 of the present invention is that it permits efficient transfer of high frequency energy from a source to a continuously moving wide zone of material for treating such materials as paper, textiles, plastic webs, arrays of strands of material, flowing powders, or fluids. In certain embodiments it may be desirable to permit the ground electrode 7 to be formed by a conductive conveyor belt or by a conductive portion of the sample being treated. In the case of sheet material being treated, for example, the ground electrode could be provided by a sheet of aluminum foil on the opposite side of the material from the treating electrodes 2. It is contemplated that the applicator 1 of the present invention is especially useful in the frequency range from 10 mHz. to 500 mHz. for delivering power to the material being treated within the range of hundreds of killowatts to hundreds of watts.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for applying high frequency electric fields to materials to be treated, a first electrode structure including at least a pair of elongated electrodes having an electrical length in excess of $\frac{1}{8}$ of a wavelength of the applied electrical field at the operating frequency thereof and disposed side-by-side in spaced apart relation with their longitudinal side edges facing each other, a second electrode structure spaced from and facing said pair of elongated electrodes and defining with said pair of electrodes a pair of elongated capacitors providing elongated electric field treatment gaps in the capacitive gaps of said capacitors having an electrical length in excess of 1/8 of a wavelength of said electric field, inductive coupling means interconnecting said pair of side-by-side elongated electrodes within at least each 1/8 of a wavelength along the electrical length of said pair of elongated electrodes for resonating the capacitances of said pair of capacitors with the inductance of said inductive coupling means, said inductive coupling means being confined to the side of said treatment gaps remote from said second electrode structure, and means for coupling high frequency energy to said first and second electrode structures at a resonant frequency thereof for exciting same into resonance and for applying high frequency energy to the material to be treated in said capacitive treatment gaps, whereby a uniform distribution of electric field is obtained in said treatment gaps without inductive coupling means extending between said first and second electrode structures in said treatment gaps to interfere with the material being treated.

2. The apparatus of claim 1, wherein said inductive coupling means comprises a plurality of inductors interconnecting said pairs of elongated first electrodes at spaced intervals distributed along the length of said electrodes, said inductive means being connected electrically in parallel with each other.

3. The apparatus of claim 1, wherein said inductive coupling means comprises a distributed inductor, said inductor being substantially axially co-extensive with the entire length of said pair of coupled electrodes.

4. The apparatus according to claim 1, including a conductive housing enclosing said first and second electrode structures and serving as an electromagnetic shield structure to minimize stray radiation of high frequency energy from said excited first and second electrode structures.

5. The apparatus of claim 1, wherein said first electrode structure includes an array of elongated electrodes disposed in side-by-side spaced relation over said second electrode structure to define an array of elongated capacitors, and wherein said inductive coupling means successively inductively couples together adjacent ones of said electrodes of said first electrode structure for resonating said array of elongated capacitors with said inductive coupling means and providing said composite electrode structure with a certain characteristic resonant frequency, and wherein said means for coupling energy to said electrode structure for exciting resonance thereof couples energy to the electrode structure at the certain resonant frequency of the composite coupled first and second electrode structures.

6. The apparatus of claim 5 including, a source of high frequency energy coupled to said composite first and second electrode structures, and wherein the frequency of said source of energy is at the resonant frequency of said composite electrode structure which corresponds to the $\pi$ mode of operation of said composite electrode structure.

7. The apparatus of claim 1, wherein said pair of electrodes are arcuate and concentrically disposed of said second electrode structure to define arcuate treatment gaps for treating tubular regions of material.

References Cited

UNITED STATES PATENTS

| 2,298,038 | 10/1942 | Crandell | 219—10.63 X |
| 2,783,349 | 2/1957 | Warren | 219—10.55 |
| 3,329,796 | 7/1967 | Manwaring | 219—10.81 X |
| 2,835,776 | 5/1958 | Blessing | 219—10.53 |
| 3,437,776 | 4/1969 | Schaeffer et al. | 219—19.81 X |

FOREIGN PATENTS 493,750   6/1953   Canada.

JOSEPH V. TRUHE, Primary Examiner

L. H. BENDER, Assistant Examiner